Dec. 9, 1958 H. E. WHITE 2,863,198
CABLE CLAMP
Filed July 15, 1954

INVENTOR.
HERBERT E. WHITE
BY
*Eber J. Hyde*
ATTORNEY

United States Patent Office 2,863,198
Patented Dec. 9, 1958

2,863,198

CABLE CLAMP

Herbert E. White, Cleveland Heights, Ohio

Application July 15, 1954, Serial No. 443,471

8 Claims. (Cl. 24—123)

This invention pertains to a cable clamp which can be used alone or in combination with an interlocking thimble.

An object of the invention is to provide a cable clamp which may be used by itself and which may be used in combination with a thimble cooperating with the clamp.

A further object of the invention is to provide a cable clamp and thimble nesting into each other to make the combination more effective.

A further object of the invention is to provide a cable clamp formed of only two parts, in addition to the bolts and nuts which hold them together, and to make the two parts identical in order to reduce costs to a minimum.

It is another object of the invention to provide a two-part cable clamp which is made highly effective by the location of three clamping bolts.

Still another object of the invention is to provide a cable clamp that locks the lay of the cable together without distorting the cable iself.

Figure 1:
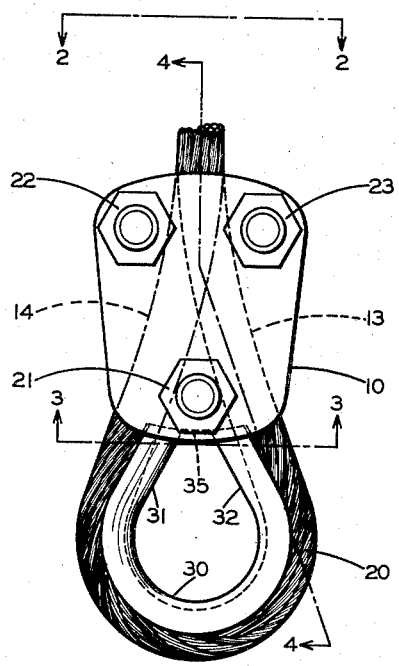
Figure 2:
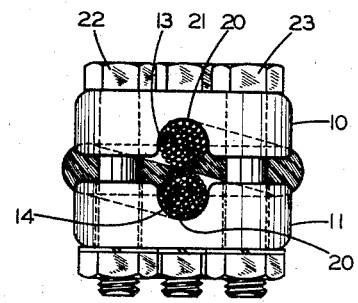
Figure 3:
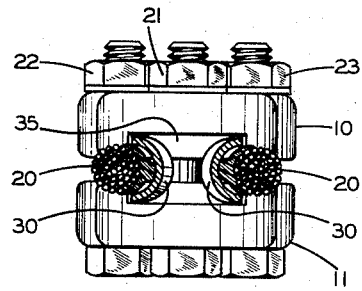
Figure 4:
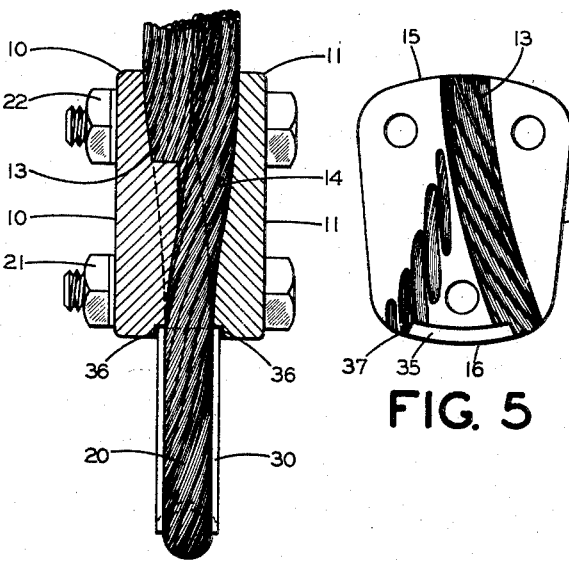
Figure 5:
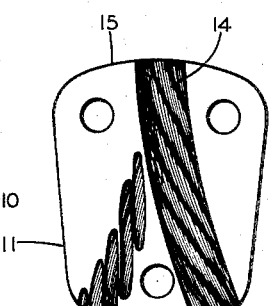
Figure 6:
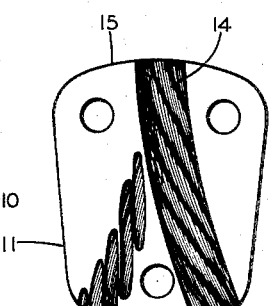

For a better understanding of the present invention, together with other and further objects thereof, reference is had to the following description taken in connection with the accompanying drawings wherein:

Figure 1 is a plan view of the clamping device and thimble cooperating with each other, Figure 2 is a sectional view taken along line 2—2 of Figure 1, Figure 3 is a sectional view taken along line 3—3 of Figure 1, Figure 4 is a sectional view taken along line 4—4 of Figure 1, and Figures 5 and 6 are detail plan views of the two main parts of the cable clamp.

As shown in the drawing, the cable clamp is comprised of two flat plates 10 and 11 which, for purposes of economy, are made identical so that only one mold or die is needed. Each plate has a curved cable groove 13, 14 extending across one of its major faces, as shown in Figs. 5 and 6, from one edge of the plate 15 to the opposite edge 16.

When the two plates 10 and 11 are placed together face-to-face, with a loop of cable 20 between them as shown in Figure 1, portions of the two grooves 13 and 14 are in registration as shown in Figures 1, 2 and 4, and other portions of the two grooves will not register with each other, as shown in Figures 1 and 4. The sections of the cable 20 which are located in the portions of the two grooves 13 and 14 in registration with each other will lie in contact with each other. Means such as the three bolts 21, 22 and 23 are provided for squeezing the two plates 13 and 14 together thereby to tightly clamp the cable 20 by squeezing together the portions of the cable which are in registration with each other. As shown in Figure 4, the lower portions of the grooves 13 and 14 which are shown separately in Figures 5 and 6, are shallower at the lower portions of the plates and the depth of the grooves 13 and 14 at the lower portion of the plates is substantially equal to that of the grooves 37 and 38. The width of the grooves is constant. Bolt 21 is located between the grooves 13 and 14 where the grooves are not in registration with each other and the other two bolts 22, 23 are located one on each side of the portions of the grooves which are in registration. Thus the three bolts form a triangle, as shown in Fig. 1, and the maximum squeezing action of the clamping device will lie within the triangle. A line of maximum force will extend between each two bolts, thereby crossing the cable along three separate lines. This is important as a much better grip is achieved than with two bolts, one on either side of the cable.

The cable clamp may be used with or without a thimble, hence, as shown in Figures 1 and 3, a thimble socket 35 is provided in the edge of the two plates 10 and 11 where the cable grooves 13, 14 are not in registration. The open end of the thimble 30 extends into this socket and is held there by the pull on the cable 20 which extends around the thimble. The walls 36 of the thimble socket 35 serve to prevent the legs 31, 32 of the thimble from spreading, thus greatly strengthening the entire device.

As shown in Figures 5 and 6 the lay of the cable is formed into the deep grooves 13, 14, and it is also formed into shallower grooves 37, 38. The shallow groove 37 cooperates with the lower end of groove 14 to hold a section of the cable and the shallow groove 38 cooperates with the lower end of groove 13 to hold a different section of the cable spaced apart sideways from groove 38. The grooves 13 and 14 are deeper at their upper end to accommodate two sections of cable, one on top of each other, as shown in Figures 1 and 4.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A cable clamp for the doubled back end of a single structural cable comprising in combination: two substantially identical plates each having a curved cable groove in one major face extending from one edge to the opposite edge so that when the two plates are together face-to-face portions of the two grooves are in registration with each other and portions of the two grooves are not in registration with each other so that when two lengths of the end of the cable are placed between the two plates, one length in each of the grooves, two sections of cable will lie in frictional contact with each other where the grooves of the plate register, and means for clamping the two plates together.

2. A cable clamp as set forth in claim 1, further characterized by said clamping means comprising three bolts through the two plates, one located between the grooves in each of the two plates where the grooves are not in registration and the other two bolts being located on either side of the grooves where the grooves are in registration.

3. A cable clamp for the doubled back end of a single structural cable comprising in combination: two substantially identical plates each having a cable groove in one major face having a portion of relatively shallow depth at one end and a portion of greater depth at the other end so that when the two plates are assembled in face-to-face relation with the deeper portions of their grooves in registration with each other the deeper sections of the two grooves will accommodate two sections of a cable one on top of the other and the shallow end portion will accommodate one portion of the cable, and means for bolting said two plates together in said face-to-face position to squeeze the cable between them.

4. A cable clamp as set forth in claim 3 further characterized by only three bolts securing said two plates together, two of said bolts being located at the end of said plates having the deeper grooves and at either side of the cable grooves.

5. A cable clamp as set forth in claim 3 further characterized by the two shallow grooves being spaced apart laterally from each other when the plates are assembled.

6. A cable clamp as set forth in claim 5 further characterized by three bolts securing said two plates together, two of said bolts being located at the end of said plates having the deeper grooves and at either side of said cable grooves and the other bolt being located at the other end of said plates and between the spaced apart grooves.

7. A cable clamp as set forth in claim 6 further characterized by the lay of the cable being formed in each of said grooves.

8. A cable clamp for the doubled back end of a single cable comprising in combination, two substantially identical plates each having a cable groove in one major face extending from one edge to another so that when the two plates are assembled with said grooved faces thereof in face-to-face relationship, two grooves are formed which grooves are adapted to receive two portions of said cable to be clamped, said two grooves terminating at one edge of said plates at spaced apart locations, and each of said plates having one half of a thimble receiving and supporting socket located between said spaced apart groove termination locations whereby a looped end of said cable outside of said clamp may pass around a thimble the spaced apart ends of which are received and supported in the said socket, and means securing said two plates together to clamp said thimble and said cable portions with said thimble positoning the cable portions to lie in said grooves.

References Cited in the file of this patent

UNITED STATES PATENTS

| | | |
|---|---|---|
| 626,527 | Connelly | June 6, 1899 |
| 902,040 | Wyckoff | Oct. 27, 1908 |
| 1,117,656 | Frederick | Nov. 17, 1914 |
| 1,699,830 | Blackburn | Jan. 22, 1929 |
| 2,278,717 | Burns | Apr. 7, 1942 |
| 2,485,445 | Hoffman | Oct. 18, 1949 |
| 2,600,417 | Morris | June 17, 1952 |

FOREIGN PATENTS

| | | |
|---|---|---|
| 35,313 | Norway | July 17, 1922 |
| 734,304 | France | Oct. 19, 1932 |